.7-33 AJ 327 5X
.2/30/86 OR RE 32,315

United States Patent [19]

Kollross

[11] E Patent Number: Re. 32,315

[45] Reissued Date of Patent: Dec. 30, 1986

[54] PROCESS AND APPARATUS FOR AUTOMATED MANUFACTURE OF LINK SAUSAGES HAVING CASINGS FORMED OF SYNTHETIC TUBULAR MATERIAL

[75] Inventor: Gunter Kollross, Dornheim, Fed. Rep. of Germany

[73] Assignee: Teepak, Inc., Oak Brook, Ill.

[21] Appl. No.: 636,494

[22] Filed: Aug. 1, 1984

Related U.S. Patent Documents

Reissue of:

[64] Patent No.: 4,358,873
Issued: Nov. 16, 1982
Appl. No.: 188,045
Filed: Sep. 17, 1980

[30] Foreign Application Priority Data

Sep. 22, 1979 [DE] Fed. Rep. of Germany ..... 2938371
Oct. 16, 1979 [DE] Fed. Rep. of Germany ..... 2941872

[51] Int. Cl.[4] ..... A22C 11/02
[52] U.S. Cl. ..... 17/33; 17/49
[58] Field of Search ..... 17/49, 41, 42, 33, 35; 53/551, 567, 563

[56] References Cited

U.S. PATENT DOCUMENTS

| | | | |
|---|---|---|---|
| 577,586 | 2/1897 | Schonland | 17/42 |
| 1,059,411 | 4/1913 | Unversaw et al. | 17/42 |
| 1,302,194 | 4/1919 | Mayer | 17/41 X |
| 1,616,971 | 2/1927 | Henderson | 17/42 X |
| 3,158,896 | 12/1964 | Marbach | 17/42 X |
| 3,209,398 | 10/1965 | Ziolko | 17/42 |
| 3,222,192 | 12/1965 | Arnold et al. | 17/42 |
| 3,454,980 | 7/1969 | Washburn | 17/35 |
| 3,570,045 | 3/1971 | Matecki | 17/34 |
| 3,703,796 | 11/1972 | Inoue et al. | 53/551 X |
| 3,805,329 | 4/1974 | Kollross | 17/33 |
| 3,805,330 | 4/1974 | Martinek | 17/49 |
| 3,919,739 | 11/1975 | Kawai | 17/33 |
| 3,964,236 | 6/1976 | Smith | 17/41 X |
| 3,981,046 | 9/1976 | Chiu | 17/49 |
| 4,070,729 | 1/1978 | Tums et al. | 17/34 |
| 4,086,684 | 5/1978 | Trimble | 17/41 |
| 4,142,273 | 3/1979 | Gay | 17/41 |
| 4,276,815 | 7/1981 | Peter | 493/287 |
| 4,306,334 | 12/1981 | Niedecker | 17/49 |

FOREIGN PATENT DOCUMENTS

| | | | |
|---|---|---|---|
| 2721392 | 11/1978 | Fed. Rep. of Germany | 493/287 |
| 1593996 | 7/1981 | United Kingdom . | |
| 384500 | 11/1973 | U.S.S.R. . | |

*Primary Examiner*—Willie G. Abercrombie
*Attorney, Agent, or Firm*—Howard M. Ellis; Michael L. Dunn

[57] ABSTRACT

An apparatus for producing link sausages first shirs previously unshirred tubular material and then conveys the shirred tubular material to a stuffing horn at which it is filled with forcemeat. A first station has the shirring structure. A transfer structure conveys the shirred material to another location at which the stuffing takes place. The filled sausages are closed off and conveyed away.

26 Claims, 4 Drawing Figures

PROCESS AND APPARATUS FOR AUTOMATED MANUFACTURE OF LINK SAUSAGES HAVING CASINGS FORMED OF SYNTHETIC TUBULAR MATERIAL

Matter enclosed in heavy brackets [ ] appears in the original patent but forms no part of this reissue specification; matter printed in italics indicates the additions made by reissue.

This invention relates to a process and apparatus for automated manufacture of link sausages formed of synthetic tubular material, wherein the material is shirred and the shirrings are gathered together as a rather long "pleated" shirred tubular piece in a first work step. The shirred tubular piece, with the folds of the shirrings gathered together are individually brought to a second work step whereat they are placed onto the stuffing horn of a sausage stuffing machine where they are filled by sections with forcemeat and then closed.

The mechanized production of sausage links with the use of charging machines has been known for quite some time. In these known machines, the meat, after being comminuted to forcemeat, is pressed through a tubular stuffing horn into the casing which is preliminarily pulled onto the stuffing horn and closed at the forward end. It has also been known, particularly with smaller diameter sausage links to produce a whole chain of sausage links in one operation with the use of rather long tubular casing sections which are shirred, wherein a clamping device disposed upstream from the shirring horn divides off the successive sausage links during the charging of the forcemeat by the setting of closure clamps to divide the chain into links. Innumerable devices have become known for bringing the maximum possible tube lengths to the stuffing horn, which devices mechanically gather the tubular material and compress it axially. However, heretofore such shirring machines have been utilized by those who produce the synthetic tubular material which is to form the casing, after which the shirred tubular material, thus produced, has been transported to those in the meat processing industry who would then place the packs of shirred tubular material into use on a sausage stuffing machine.

For shirring the synthetic tubular material, i.e. tubes made especially of natural of regenerated cellulose, it is necessary to bring the material up to a moisture content of 14 to 18%. However, in this state, the tubular material forms a culture medium for bacteria which then rapidly destroys the material. Therefore, it has been necessary to withdraw the moisture from the shirred tubular pieces after the shirring operation and before the shirred product could be shipped to the meat processor where it might have to be stored for short or long periods of time. Also, the processing of the shirred tubular pieces at the sausage charging machine requires a moisture content higher than in the shirring operation, namely at least 22%. The shirred tubular pieces therefore had to be moistened again before processing on the sausage charging machine, an operation which in practice required many hours in order to insure that the moisture penetrated completely into the folds between the shirrings.

More recently, attempts have been made to leave the said moisture content of 14 to 18% in the shirred product by subjecting the product to a sterilizing treatment under heat and then appropriately packaging the product. Attempts have also been made to increase the moisture content of the shirred product immediately after its formation, again accompanied by suitable sterilizing and packaging steps, so that the product could be utilized immediately by the sausage manufacturer. However, these previous procedures have suffered from the disadvantages that the costs of such sterilizing and sterile packaging equipment has been considerable. In addition, the shirred tubular product as prepared by the manufacturer of the synthetic tubular material takes up considerable storage space on the premises of the sausage manufacturer, notwithstanding the fact that the density of the shirred product is so much greater than the density of an unshirred tubular product. Hence, to be sure that he had sufficient shirred product for his manufacturing operation, the sausage manufacturer had to have a very large storage space. Moreover, the handling of the packaged, gathered tubular product involves extra labor which must be performed by skilled workers in order to avoid damage to the delicate shirred tubular product while removing the same from their packages.

The present invention provides a method and apparatus for avoiding the above described disadvantages experienced by the sausage manufacturer and also for eliminating the above described sterilization problems and considerably simplifying storage of the tubular material prior to its use on the sausage stuffing machine.

According to the present invention, these problems are solved by bringing the tubular material up to its final moisture content before the shirring operation. Then after the shirring operation the shirred lengths of tubular material are immediately transferred to the stuffing horn of a sausage stuffing machine whereat they are filled then formed into individual sausage links.

The present invention therefore makes unnecessary intermediate drying or sterilizing and germ-free packaging. Rather, the meat processor can simply receive the unshirred tubular material from the manufacturer in the form of rolls on which the moisture free tube (or a tube which has at least a low moisture content) is rolled flat. Since the tubular material in this form requires considerably less space than after it has been shirred, the sausage manufacturer will need considerably less storage space.

The sausage manufacturer can perform the shirring operation with far simpler means than was required when shirring was performed by the manufacturer of the tubular material because since the economics of a high density pack for transport and storage need no longer be considered, the sausage manufacturer need not form corrugated shirred pieces having as high a density of shirrings as was required by the manufacturer of the tubular material. Also, since the present invention mechanizes the delivery of the shirred tube onto the stuffing horn of the sausage stuffing machine, it is no longer necessary to maintain a high stiffness in the shirred product as was required heretofore by the sausage manufacturer to insure proper placing of the shirred product by the workman onto the stuffing horn.

With the present invention, the long moistening time required heretofore for moistening the previously shirred product to produce the necessary moisture content for the sausage stuffing operation is eliminated because the unshirred tubular material drawn from the rolls can be given the necessary moisture content as it passes from the rolls to the shirring device.

Accordingly, an apparatus for carrying out the process of the present invention is provided with a shirring device for shirring of the tubular material as it passes along a tube, together with mean for transferring the shirred lengths of tubular material to the stuffing horn of a sausage stuffing machine and clamping the ends of the filled lengths of tubular material of successive sausage links.

According to a first embodiment of the present invention, the sausage stuffing machine is provided with at least two stuffing horns which can be alternately brought to the forcemeat charging position, and the shirring device is disposed upstream of the stuffing horn other than that located at the said charging position.

According to another embodiment of the present invention, a transfer device comprising a revolving head includes a pair of intermediate transfer tubes thereon spaced 180° apart. They are so arranged that after a given intermediate transfer tube receives a gathered length of tubular material from the shirred device it can be moved through 90°, whereupon the said gathered length is removed therefrom onto a stuffing horn.

In still another embodiment of the present invention, the means for transferring the corrugated shirred length of tubular material from the shirring device to the stuffing horn may comprise a hollow chamber which is alternately movable, for example pivotable, between a first position whereat it receives the shirred length to a second position whereat is positioned to allow the shirred length to be slid onto the stuffing horn.

In accordance with any of the embodiments of the invention, it is advantageous to provide a bath upstream from the shirring device through which the tubular material passes for purposes of bringing the tubular material up to the required moisture content for the shirring step as well as the forcemeat charging step.

Other features and advantages of the present invention will become apparent from the detailed description to follow.

The invention will now be described in detail with reference to the accompanying drawings which illustrate a preferred embodiment of the invention, and wherein.

In all of the illustrated embodiments, like elements are represented by like numerals. In all of these embodiments there is shown a sausage stuffing machine 10 provided with a charging hopper 12 for the meat that is to be comminuted in the machine, which the stuffing machine delivers as "sausage forcemeat" via a lateral forcemeat ejector under pressure, namely a stuffing horn, which delivers the same into the synthetic tubular material which is then divided off by means of clamps to form sausage links. Clamping devices are known per se and will therefore be shown only schematically in the accompanying drawings and described only generally.

Figure 1:
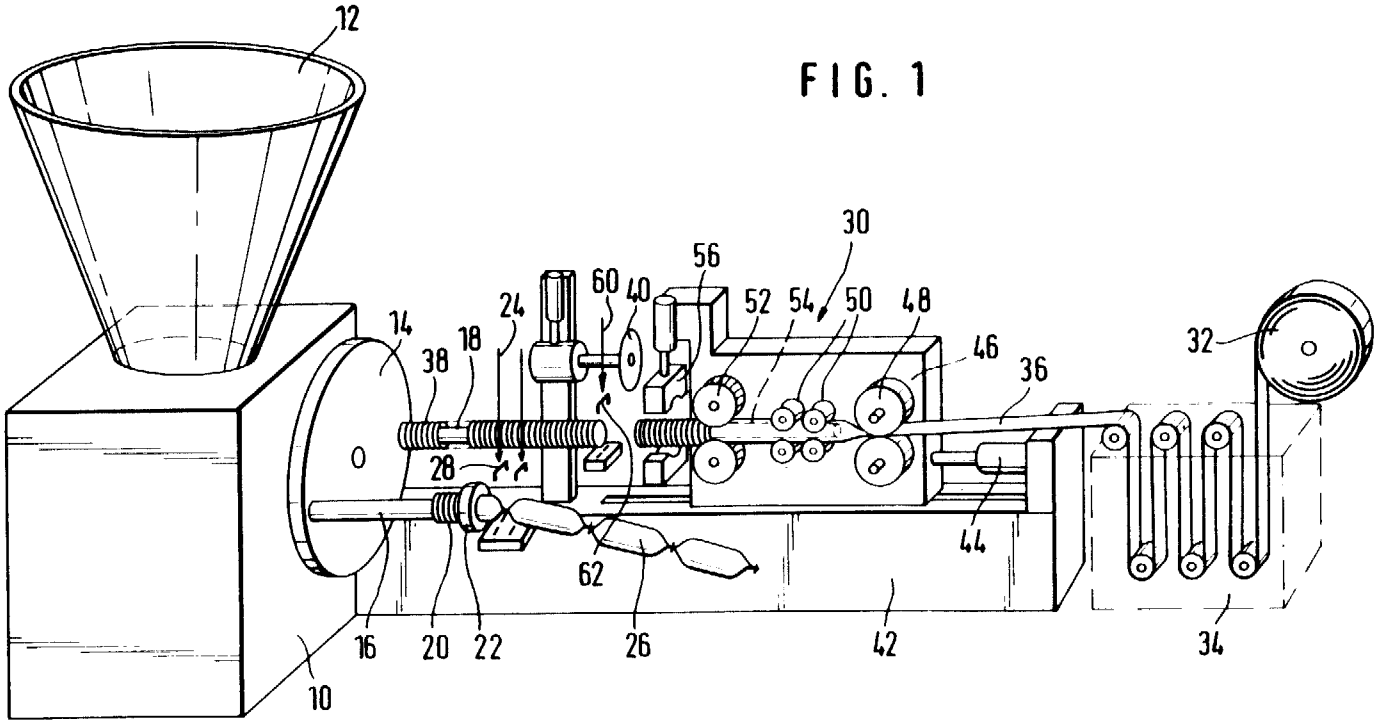
FIG. 1 is a schematic, perspective view of an apparatus for the automated production of sausage links using tubular synthetic material supplied thereto in flat form on a roll.

Referring to FIG. 1, on the forcemeat ejection side of the stuffing machine 10 there is shown a revolving plate 14 with a pair of stuffing horns 16 and 18 connected to the plate 14 and capable of being shifted therewith about the axis of plate 14 through 180° (by a drive means which is not shown). In FIG. 1 the stuffing horn 16 is shown in alignment with the forcemeat ejection means of the sausage stuffing machine 10 whereat it serves to receive forcemeat and deliver the same into the shirred tubular piece 20 disposed thereon. A casing gripper 22 pulls the material of tubular piece 20 outwardly, unfolding the shirrings as the forcemeat is delivered thereto. At the appropriate intervals, the clamping device 24 sets two clamps 28 into the tube, in a manner known per se, thereby dividing the tube into successive sausage links 26.

At this time the other stuffing horn 18 is in alignment with a shirring device 30, by means of which a length 36 of tubular synthetic material is delivered from a reserve roll 32 via a water bath 34 and then shirred axially to form a shirred tubular piece 38 on the other stuffing horn 18. After the desired length of piece 38 has been attained, it is separated from the remainder of the length 36 by a cutter 40. For this purpose the shirring device 30 is provided with a slide member 46 movable under the action of a power cylinder 44 along a guide bed 42 on which, in a manner known per se, there are disposed a pair of squeeze rolls 48, two pairs of draw rolls 50 and a pair of shirring rolls 52 which form the shirrings on the length of tubular material 36 and cause these shirrings to gather together as they move onto the stuffing horn 18. The drive means for the respective rolls are known per se and are therefore not shown in the figures. In the region of draw rolls 50 and shirring rolls 52 there is provided a tube 54 which floats within the tubular material (indicated in dashed lines in FIG. 1). After a shirred tubular piece of the desired length has been produced, a clamping jaw device 56, comprising at least two pneumatically or hydraulically actuated jaws, clamps the tubular length of material against the tube 54.

Figure 2:
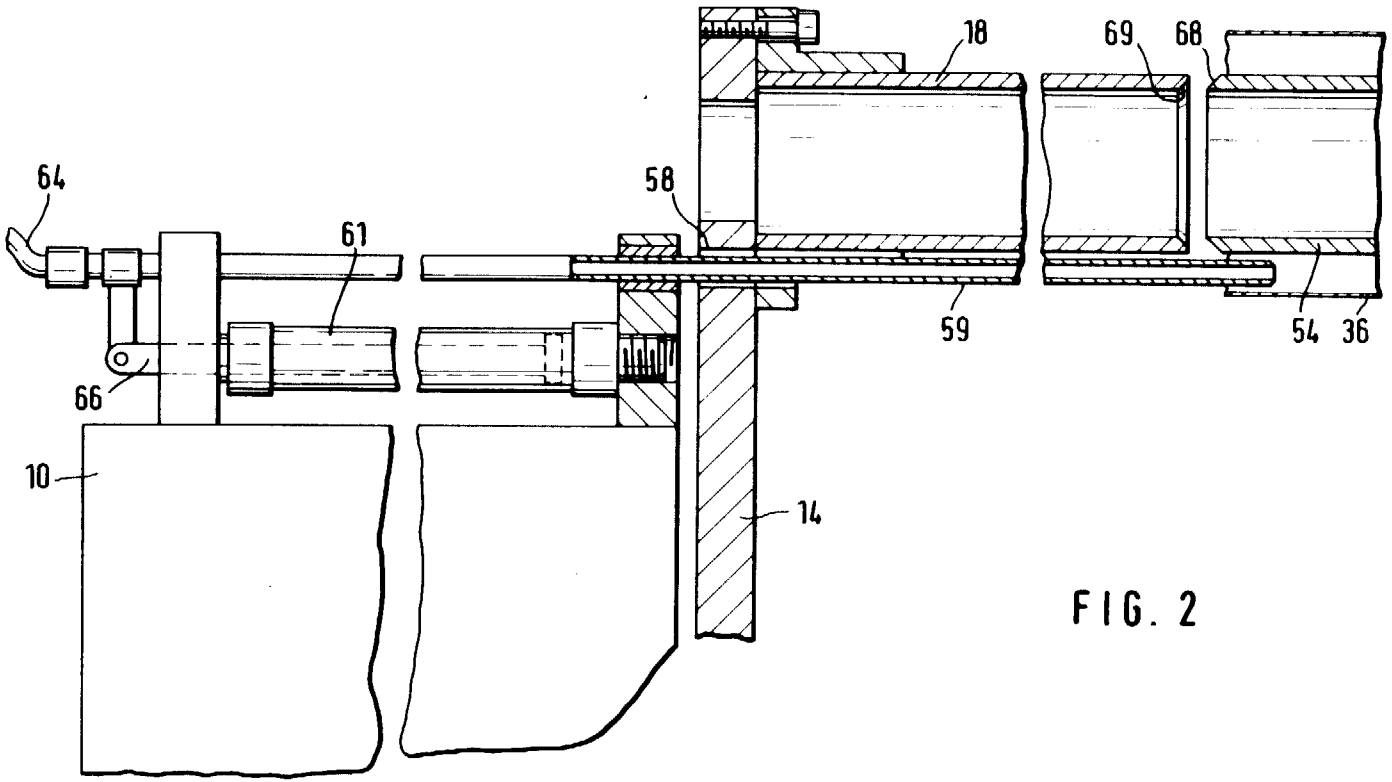
FIG. 2 is an enlarged view, partially in cross section, of a portion of FIG. 1 in the region where the stuffing horn receives a shirred tubular piece.

FIG. 2 illustrates on an enlarged scale revolving plate 14 including a perforation 58 located adjacent the stuffing horn 18. Through opening 58 a cannula 59 can be introduced by means of a power cylinder 61 mounted on the stuffing machine 10 from the rear side of plate 14 opposite from that on which the stuffing horns 16 and 18 are mounted. When moved forwardly through the opening 58, the cannula 59 can move into a position just adjacent the floating tube 54, whereat it can supply air under a slight excess pressure as required in order to inflate the tubular material 36 to facilitate the shirring step. The air is delivered to the cannula 59 by means of an air tube 64. When piston rod 66 of the power cylinder 61 is extended, cannula 59 assumes a retracted position in which it is moved completely behind the revolving plate 14, thereby permitting the latter to rotate about its axis without hinderance from the cannula 59.

The apparatus shown in FIG. 1 operates as follows. Assume first that the tubular length 36 has been drawn through roll pairs 48, 50, 52 and via floating tube 54 into shirring device 30, to the left end of floating tube 54, and that there is an empty stuffing horn ahead of shirring device 30. Now slide member 46 will first be moved to the left by actuation of power cylinder 44 until the tube 54 with a conical transition zone 68 comes into contact with the end of stuffing horn 18 which has a corresponding hollow conical end 69. Clamping jaw device 56 is opened. Now the drives of the roll pairs are switched on, and draw rolls 50 pull the tubular material from drum 32 through the water bath 34, where the tubular material is given the moisture content necessary for shirring as well as for stuffing. Rolls 52 shir the drawn tubular material together axially, with formation of folds, and therewith form tubular piece 38 on stuffing horn 18. When stuffing horn 18 is filled over its whole length with shirred tubular material, the drive of the pairs of rolls is cut off, clamping jaw device 56 closes, and slide member 46, by actuation of power cylinder 44 is pulled back a relatively short distance, entraining tube 54, whereby in the zone between tube 54 and stuffing horn 18 the tubular piece 38 is pulled out so that by means of clamping device 60 a closure clamp 62 can be set on, and between this and the clamping jaw device 56 the tubular material can be cut off by means of cutter 40. At the same time, cannula 59 is moved through opening 58 in plate 14, by means of power cylinder 61, away from the region of revolving plate 14.

When stuffing horn 16 no longer has any tubular material, i.e. the tubular piece 20 thereon has been completely used up, the clamping device 24 with the casing gripper 22 thereon will be moved out from the region of stuffing horn 16, and the revolving plate 14 is thereupon swung through 180° so that the stuffing horn 18 bearing the new shirred tubular piece 38 takes its position before the forcemeat ejection of machine 10. Clamping device 24 is now moved toward stuffing horn 18 with the tubular piece 38 thereon, whereby casing gripper 22 engages the end of tubular piece 38, closed with clamp 62, and the stuffing machine can then be switched on for stuffing new links of tubular pieces. Thereby the shirring devices is in the above mentioned starting position, and with a renewed advance of slide member 46 and cannula 59, a new shirring process can begin, which in general will be completed more rapidly than the stuffing of the tubular piece 38 on stuffing horn 18 with sausage forcemeat.

Figure 3:
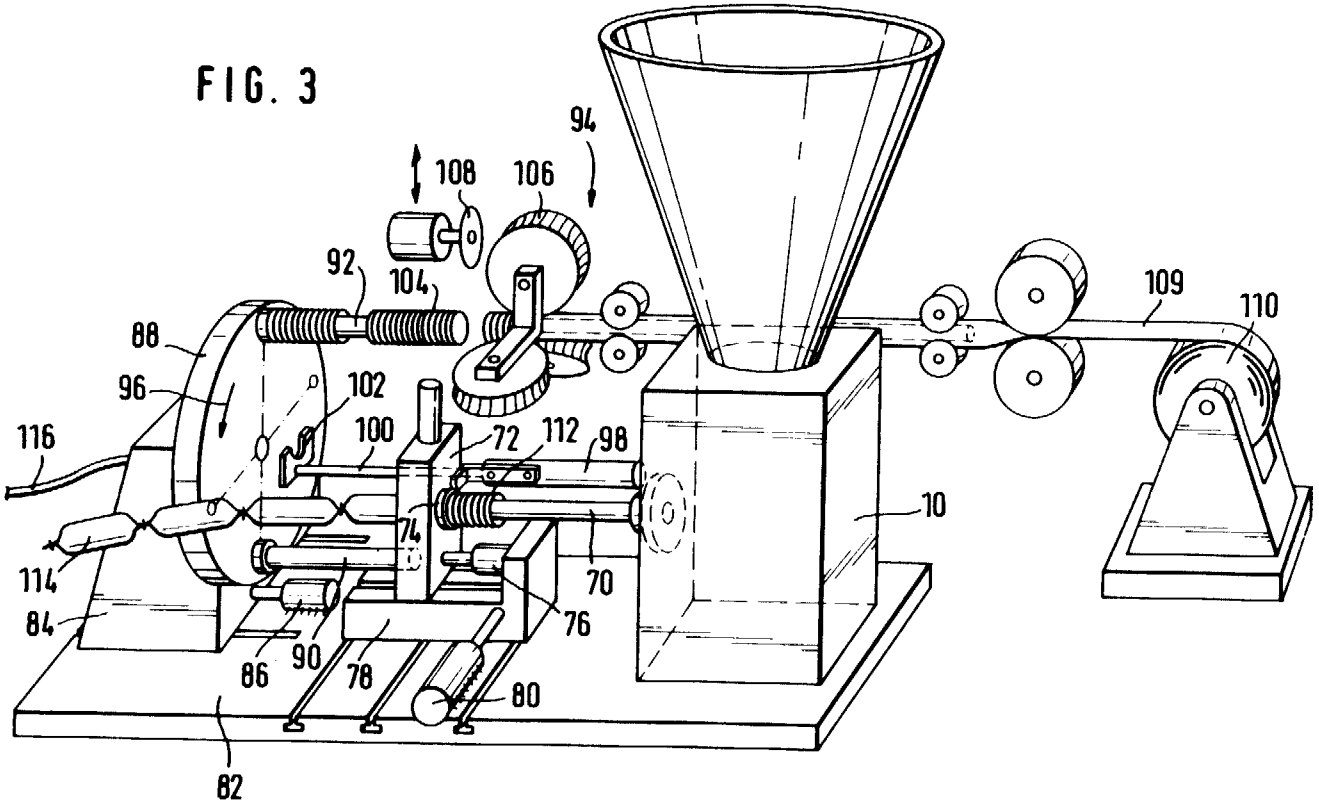
FIG. 3 is a perspective, schematic view similar to FIG. 1 but showing another embodiment of the present invention.

In the apparatus of FIG. 3, the sausage stuffing machine 10 is provided with a single stuffing horn 70 fixed to it, before which once again there is a clamping device 72 with a casing gripper 74. Clamping device 72 can be moved by means of a power cylinder 76 on a slide member 78 in the longitudinal direction of stuffing horn 70. Slide member 78 in turn can be moved transversely to stuffing horn 70 by means of a power cylinder 80 on a machine base 82. On the machine base there is also provided a stand 84 which can be moved in the longitudinal direction of stuffing horn 70 by means of a power cylinder 86. Stand 84 bears a revolving plate 88 and contains a drive (not illustrated) to move the plate 88 in stages by 90°. On revolving plate 88 there are fixed two diametrically opposed intermediate transfer tubes 90, 92, whereof in the illustrated position transfer tube 92 is before a shirring device 94. When revolving plate 88 is turned by 90° in the direction of arrow 96, transfer tube 92 comes into a position in which it is aligned with stuffing horn 70.

An elongated power cylinder 98 is fixed on clamping device 72, and its piston rod 100 bears a pusher 102 which when piston rod 100 is extended and slide member 78 with clamping device 72 has moved laterally away from the region of stuffing horn 70, reaches into the swing path of transfer tube 92 and there engages the end of a shirred tubular piece 104 formed thereon by the shirring device 94 when revolving plate 88 is swung by 90° from the position illustrated in FIG. 3 in the direction of arrow 96.

The shirring device 94 is built in principle like the device 30, and for this reason in FIG. 3 it is represented only by the roll pairs, except that in this case there are three shirring rolls 106. Here also a cutter 108 is provided, with which the tubular material 109 can be separated between tube 92 and device 94 after completion of a shirring operation.

Tubular material 109 is drawn off a reserve roll 110 and thereby it can, as in the device according to FIG. 1, pass through a water bath that is not illustrated here, to give the tubular material the necessary moisture content for shirring and also for stuffing.

The apparatus according to FIG. 3 operates as follows:

Here also it is assumed that at first the transfer tube 92 is empty and that on stuffing horn 70 there is a shirred tubular piece 112. Clamping device 72 is in the illustrated operative position in which casing gripper 74 engages the end of stuffing horn 70 and the tubular material of piece 112 is pulled by the casing gripper under the pressure of the forcemeat supplied from stuffing machine 10, and is divided into sausage links 114 with application of clamps.

Independently of this, stand 84 is moved by actuation of power cylinder 86 with the empty transfer tube 92 toward shirring device 94, and a new tubular piece 104 is produced on transfer tube 92. As shown in the drawing, the other tube 90 is thereby in a position to the side, below stuffing horn 70, so that production of sausages 114 is not hindered. When the tubular piece 104 is completed, stand 84 with revolving plate 88 and transfer tubes 90, 92 is moved back, and tubular piece 104 is separated from the rest of the length 109 of tubular material by cutter 108. When now tubular piece 112 on stuffing horn 70 is also consumed by stuffing with forcemeat, clamping device 72 is first moved axially away from stuffing horn 70 by actuation of power cylinder 76, and then crosswise thereto by the actuation of power cylinder 80, into the above mentioned position in which pusher 102 is in the swing path of transfer tube 92 with piston rod 100 extended. Revolving plate 88 is now moved by 90° so that pusher 102 engages the end of tubular piece 104 on transfer tube 92. Now stand 84 is moved forward by means of power cylinder 86 and thereby transfer tube 92 is aligned with and adjacent to stuffing horn 70. By actuation of power cylinder 98, piston rod 100 thereupon moves in, and pusher 102 removes tubular piece 104 from the tube 92 onto stuffing horn 70. Immediately thereafter stand 84 moves back again by a reversed actuation of power cylinder 86, and revolving plate 88 is moved further by 90°, whereby empty transfer tube 90 is brought before the shirring device 94. Clamping device 72 is then restored to its operating position by successive actuation of power cylinders 80, 76, in which position casing gripper 74 engages the tubular material at the end of tubular piece 104 and the stuffing machine 10 is switched on again.

It is clear that with this arrangement the beginning of the tubular piece 104 cannot be closed immediately after it is produced because the end that is to be closed is at the base end of transfer tube 92. In this case therefore, after drawing tubular piece 104 into stuffing horn 70 the free end of tubular piece 104 must be suitably closed before the clamping device 72 and casing gripper 74 are brought into the operating position.

In the device shown in FIG. 3 moreover there is no need for the tube to float inside the device 94, as in the arrangement according to FIG. 1. In this case the shirring device 94 must be moved with shirring rolls 106 onto the tube disposed on revolver plate 88, to have the necessary bracing inside the zone of the shirring rolls for the shirring.

The supply of the air needed for the shirring is effected in the arrangement according to FIG. 3 via an air tube 116 to stand 84 and revolving plate 88 where it is taken by a distributor device (not illustrated) to that transfer tube positioned before the shirring device 94.

Figure 4:
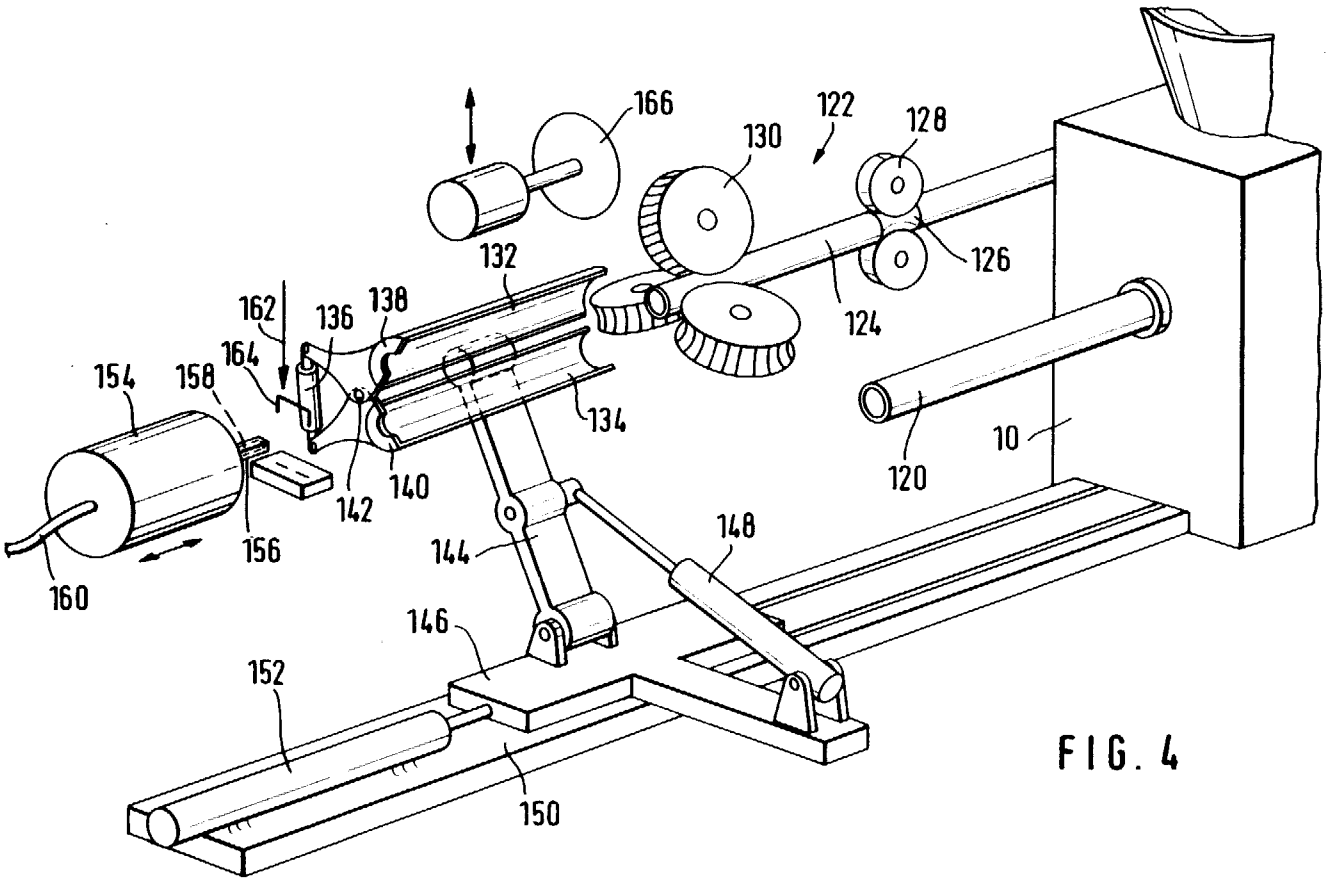
FIG. 4 is also a perspective, schematic view similar to FIGS. 1 and 3 but showing still another embodiment of the present invention.

In the embodiment shown in FIG. 4 the stuffing machine 10 also has only a single fixed stuffing horn 120, and the shirring device 122 which otherwise is constructed like the previously described devices has a floating tube 124 parallel thereto which may have a reduced cross-section portion 126 in which a pair of draw rolls 128 engage the tubular material that is not shown, to prevent undesired axial shifting of floating tube 124.

Differing from the previously described devices, the shirred tubular piece formed by shirring rolls 130 is not thrust onto a fixed tube but is delivered to a hollow chamber that consists of two opposed swingable half shells 132, 134 which can be swung toward each other by means of a power cylinder 136 so that they form a cylindrical cavity. The ends of half shells 132, 134 which face away from shirring device 122 are furnished with semicircular stops 138, 140 which prevent the tubular piece from issuing from the half shells. Half shells 132, 134 are fixed to a lever 144 along their common pivot shaft 142, said lever 144 being articulated swingably on a slide member 146. By means of a power cylinder 148, the cavity device constituted by the half shells 132, 134 can be swung from the illustrated position in which it is aligned with shirring device 122, into a second position in which it is aligned with stuffing horn 120. Slide member 146 is borne in the longitudinal direction of charging tube 120 on a guide bed 150, and it can be moved to the stuffing machine 10 by means of a power cylinder 152.

At the end of the cavity device 132, 134 that faces away from device 122 there is also a controlled axially movable twisting device 154 with a rotatably drivable four-sided shaft 156 which, the course of the shirring, can be moved toward the cavity device 132, 134 in such a way that the four-sided shaft 156 engages in the cavity. Four-sided shaft 156 also has an axially extending opening 158 through which the compressed air necessary for the shirring operation can be delivered via an air tube 160.

Finally, on the end of cavity device 132, 134 which faces away from the device 122 there is provided a clamping device shown schematically at 162 for delivering clamps 164, and at the other end of the cavity device there is a cutter 166.

The apparatus according to FIG. 4 operates as follows:

It will be assumed that the individual parts of the apparatus are in the position shown in the figure and that tubular material (not shown) is delivered to shirring device 122, being engaged by shirring rolls 130. At this time the two half shells 132, 134 are closed by actuation of power cylinder 136, and the twisting device 154 is located with four-sided shaft 156 projecting into the space between half shells 132, 134. Shirring device 122 is thereupon switched on, and the shirring rolls 130 form a shirred tubular piece (not shown) inside cavity device 132, 134, the forward end of the said tubular piece being engaged by four-sided shaft 156. When cavity device 132, 134 is filled to its full length with the tubular material, the twist device 154 is switched on and retracted at the same time, whereby four-sided shaft 156 twists the tubular material at the end of the tubular piece and pulls it from cavity device 132, 134. This twisted end is closed by a clamp 164 by means of clamping device 162. At the same time the cutter (not shown) is actuated and it separates the tubular piece in the cavity device from the rest of the length of tubular material.

Twisting device 154 is thereupon retracted into the position which releases the end of the tubular piece, and the cavity device 132, 134 is swung by actuation of power cylinder 148 before charging tube 120, and by actuation of power cylinder 152 it is moved forward toward stuffing machine 10, whereupon the tubular piece in the cavity device is thrust onto stuffing horn 120. Power cylinder 136 is not actuated and opens half shells 132, 134 so that upon the subsequent moving back of slide member 146 under the action of power cylinder 152, the tubular piece is not drawn off of stuffing horn 120. At the end of the sliding movement, power cylinder 148 swings the cavity device once more before the shirring device 122 for a repetition of the above described process.

In this arrangement also there is a clamping device (not illustrated) which is now brought before stuffing horn 120 and a device is thrust onto stuffing horn 120 having a casing gripper disposed thereon. The stuffing machine 10 is thus ready to produce a new length of sausage links by processing the tubular piece now on stuffing horn 120.

Although the invention has been described in considerable detail with respect to preferred embodiments thereof, it will be apparent that the invention is capable of numerous modifications and variations, apparent to those skilled in the art, without departing from the spirit and scope of the invention, as defined in the claims.

I clearly explain that "charging tube" may also, and preferably, be defined as a "stuffing horn" and "gatherings and corrugations" may also, and preferably, be described as "shirrings". In this connection the term "shirring" means pushing forwardly the charging tubular material by means of rolls 52, 106 and 130, respectively, against a stop on a mandrel means thereby forming circumferentially extending pleats or folds by which the axial length of said tubular materially is very much reduced.

I claim:

1. An apparatus for the production of link sausages, comprising *in combination*:

[a] shirring means for receiving an unshirred tubular length of sausage casing material and shirring [it, forming] *said material to form* folds [taken] in the axial direction, a stuffing horn *in proximity to the shirring means* for receiving forcemeat and delivering the forcemeat into the *shirred* tubular [sausage casing] material [thereon],

*means for positioning shirred tubular material from the shirring means to the stuffing horn,* means for positioning *said stuffing horn with* the shirred tubular material [on the stuffing horn with the stuffing horn positioned] *thereon* at [the] *a* location [to receive] *for receiving and delivering* forcemeat [and deliver it] into the tubular casing material [,] *for* filling the tubular casing and pulling out the [shirring] folds,

[and clamping] means for closing off [the] filled sections of the tubular casing [to form the] *for forming* separate sausage links, the location of the stuffing horn during filling of said shirred tubular casing thereon being spaced from the location at which the shirring means forms a length of shirred tubular casing material, so that a further length of tubular casing material can be shirred by the shirring means while the first *of* said shirred length of tubular casing material is being filled with forcemeat and formed into [separate] *the* sausage links, and [including] means for mounting a source of flattened, unshirred tubular casing material and delivering [the same] *it* to the shirring means, and moistening means *positioned* between the source *of casing material* and the shirring means for moistening the tubular casing material to a moisture content sufficient for the step of filling the tubular casing material with forcemeat.

2. An apparatus according to claim 1 including means for delivering air into the length of tubular material as it approaches the shirring means.

3. An apparatus for the production of link sausages, comprising:

a shirring means for receiving an unshirred tubular length of sausage casing material [and], shirring [it, forming] *said material to form* folds [taken] in the axial direction,

[a stuffing horn] *first and second stuffing horns* for receiving forcemeat and delivering the forcemeat into the tubular sausage casing material thereon, means for positioning *said stuffing horns with* the shirred tubular material [on the stuffing horn with the stuffing horn positioned] *thereon* at [the] *a* location [to receive] *for receiving and delivering* forcemeat [and deliver it] into the tubular casing material, filling the tubular casing and pulling out the [shirring] folds,

[and clamping] means for closing off [the] filled sections of the tubular casing to form [the] separate sausage links, the location of the *first* stuffing horn during filling of said shirred tubular casing thereon being spaced from the location *of the second stuffing horn* at which the shirring means forms a length of shirred tubular casing material, so that a further length of tubular casing material can be shirred by the shirring means while the first *of* said shirred length of tubular casing material is being filled with forcemeat and formed into [separate] *the* sausage links, said shirring means including rollers mounted on a slide member movable toward and away from the *second* stuffing horn at the [first] location *where the shirring means forms a length of shirred tubular casing material*, means for cutting the [tube] *shirred tubular casing material* between the stuffing horn and the said rollers, and clamping means for clamping closed the just cut end of the shirred tubular length of casing material on the *second* stuffing horn after [the] operation of the [cutter] *cutting means*, and [including] a floating tube supporting the tubular length of casing material as it passes through said rollers, said floating tube being aligned with and movable axially towards and away from the *second* stuffing horn at the [first] location *where the shirring means forms a length of shirred tubular casing material*, whereby the floating tube is movable out of the path of the cutting means during operation of the cutting means.

4. An apparatus according to claim 3, including means for mounting a source of flattened, unshirred tubular casing material and delivering [the same] *it* to the shirring means, and a moistening means *positioned* between the source *of casing material* and the shirring means for moistening the tubular casing material.

5. An apparatus according to claim 3, *wherein* said [two] *first and second* stuffing horns [being] *are* mounted on a revolving plate which is rotatable to move the stuffing horns alternately to said [first] location *where the shirring means forms a length of shirred tubular casing material* and said location to receive forcemeat to deliver it into the casing material.

6. An apparatus according to claim 3, including means for delivering air into the length of tubular material being delivered to the shirring means over the floating tube.

7. An apparatus according to claim 6, said means for delivering air including a tube movable outwardly through an opening in the revolving plate and retractable to a position behind the revolving plate to allow the revolving plate to revolve.

8. An apparatus according to claim 3, including a clamping jaw device for clamping the shirred tubular casing material on the floating tube and moving the same away from the *second* stuffing horn to provide a space between [the tubes] *said floating tube and said second stuffing horn* for operation of said clamping means and said cutter.

9. An apparatus for the production of link sausages, comprising *in combination*:

[a] shirring means for receiving an unshirred tubular length of sausage casing material and shirring [it, forming] *said material to form* folds [taken] in the axial direction, a stuffing horn *in proximity to the shirring means* for receiving forcemeat and delivering the forcemeat into the tubular sausage casing material [thereon], means for positioning the shirred tubular material on the stuffing horn with the stuffing horn positioned at [the] *a* location [to receive] *for receiving and delivering* forcemeat [and deliver it] into the tubular casing material, filling the tubular casing and pulling out the [shirring] folds,

[and clamping] means for closing off [the] filled sections of the tubular casing [to form the] *for forming* separate sausage links, the location of the stuffing horn during filling of said shirred tubular casing thereon being spaced from the location at which the shirring means forms a length of shirred tubular casing material, so that a further length of tubular casing material can be shirred by the shirring means while the first *of* said shirred length of tubular casing material is being filled with forcemeat and formed into [separate] *the* sausage links, and [including a] transfer means *for transporting shirred tubular material, said transfer means* having at least two transfer tubes, each movable at least from a first location at which it receives a shirred tubular casing material from the shirring means, a second location whereat it is positioned to deliver the shirred tubular casing material to the stuffing horn, and a third location separate from and spaced [away] from the first two locations, so that the length of shirred tubular material on the stuffing horn can be filled with forcemeat at the second location while the other transfer tube is at the first location to receive the next length of shirred tubular casing material.

10. An apparatus according to claim 9, including means for mounting a source of flattened, unshirred tubular casing material and delivering [the same] *it* to the shirring means, and a moistening means *positioned* between the source *of casing material* and the shirring means for moistening the tubular casing material.

11. An apparatus according to claim 9, said transfer tubes being parallel to each other and mounted on a common revolving plate 180° apart relative to the rotational axis of the plate, said second location being 90° from the first location and the third location being 90° from the second location, whereby a transfer tube just receiving a length of shirred tubular casing material is movable 90° to deliver it onto the stuffing horn and then another 90° to a location out of the way of the stuffing horn.

12. An apparatus according to claim 9, 10, or 11, including a longitudinally movable pusher for pushing a length of shirred tubular casing material from the transfer tube that has just moved to the second location onto the stuffing horn aligned therewith.

13. An apparatus according to claim 12, said means for pulling out the shirred folds and clamping closed the separate sausage links being mounted on a slide member movable axially of the stuffing horn at said second location and transversely away from the stuffing horn.

14. An apparatus for the production of link sausages, comprising:

a shirring means for receiving an unshirred tubular length of sausage casing material and shirring [it, forming] *said material to form* folds [taken] in the axial direction, a stuffing horn for receiving forcemeat and delivering the forcemeat into the tubular sausage casing material thereon, means for positioning the shirred tubular material on the stuffing horn with the stuffing horn positioned at [the] *a* location to receive forcemeat and deliver it into the tubular casing material, filling the tubular casing and pulling out the [shirring] folds,

[and clamping] means for closing off the filled sections of the tubular casing to form [the] separate sausage links, the location of the stuffing horn during filling of said shirred tubular casing thereon being spaced from the location at which the shirring means forms a length of shirred tubular casing material, so that a further length of tubular casing material can be shirred by the shirring means while the first *of* said shirred length of tubular casing material is being filled with forcemeat and formed into [separate] *the* sausage links, and [including] a transfer means comprising a hollow shell for encasing and thus receiving therein the length of shirred tubular casing material, said hollow shell being movable at least between a first location for receiving a length of shirred tubular casing material therein from the shirring means and a second location whereat it is positioned to deliver [the] said length of shirred tubular casing material to the stuffing horn.

15. An apparatus according to claim 14, including means for mounting a source of flattened, unshirred tubular casing material and delivering [the same] *it* to the shirring means, and a moistening means *positioned* between the source *of casing material* and the shirring means for moistening the tubular casing material.

16. An apparatus according to claim 14, said transfer means being movable axially at the second location to deliver the length of shirred tubular casing material onto the stuffing horn.

17. An apparatus according to claim 16, wherein the hollow shell comprises at least two half shells which are movable apart to release the length of shirred tubular casing material on the stuffing horn.

18. An apparatus according to claim 17, including, at the end of the hollow shell facing away from the stuffing horn, a means for delivering air into the tubular casing material located therein and a closure means for closing that end of the length of tubular material located in the hollow shell.

19. An apparatus according to claim 18, wherein the means for delivering an air supply includes a twisting device for twisting the adjacent end of the tubular length of material, said twisting device having an opening passing axially therethrough and comprising said means for delivering air.

*20. An apparatus for the production of link sausages, comprising in combination:*

*shirring means for receiving an unshirred tubular length of sausage casing material and shirring said material to form folds in the axial direction,*

*a stuffing horn in proximity to the shirring means for receiving forcemeat and delivering the forcemeat into shirred tubular material,*

*automatic mechanical transfer means for positioning shirred tubular material from the shirring means to the stuffing horn,*

*means for positioning said stuffing horn with the shirred tubular material thereon at a location for receiving and delivering forcemeat into the tubular casing material for filling the tubular casing and pulling out the folds,*

*means for closing off filled sections of the tubular casing for forming separate sausage links,*

*the location of the stuffing horn during filling of said shirred tubular casing thereon being spaced from the location at which the shirring means forms a length of shirred tubular casing material, so that a further length of tubular casing material can be shirred by the shirring means while the first mentioned length of shirred tubular casing material is being filled with forcemeat and formed into the sausage links, and*

*means for mounting a source of flattened, unshirred tubular casing material and delivering it to the shirring means.*

*21. An apparatus according to claim 20, including means for delivering air into the length of tubular material as it approaches the shirring means.*

*22. An apparatus according to claim 20 wherein said shirring means includes rollers mounted on a slide member, said slide member being movable toward and away from said stuffing horn, a floating tube for supporting the tubular length of casing material as it passes through said rollers and means for cutting the shirred tubular material between said stuffing horn and said rollers, whereby said*

*floating tube is movable out of the path of the cutting means during operation of said cutting means.*

*23. An apparatus according to claim 20 wherein the flattened tubular material on the mounting and delivering means has a moisture content sufficient for shirring and filling.*

*24. An apparatus for the production of link sausages, comprising in combination:*

*shirring means for receiving an unshirred tubular length of sausage casing material and shirring said material to form folds in the axial direction,*

*a stuffing horn in proximity to the shirring means for receiving forcemeat and delivering the forcemeat into shirred tubular material,*

*automatic mechanical transfer means for positioning shirred tubular material from the shirring means to the stuffing horn,*

*means for positioning said stuffing horn with the shirred tubular material thereon at a location for receiving and delivering forcemeat into the tubular casing material for filling the tubular casing and pulling out the folds,*

*means for closing off the filled sections of the tubular casing for forming separate sausage links,*

*the location of the stuffing horn during filling of said shirred tubular casing thereon being spaced from the location at which the shirring means forms a length of shirred tubular casing material, so that a further length of tubular casing material can be shirred by the shirring means while the first mentioned length of shirred tubular casing material is being filled with forcemeat and formed into the sausage links, and*

*means for mounting a source of flattened, unshirred tubular casing material and delivering it to the shirring means, said flattened material having a moisture content sufficient for shirring and filling.*

*25. An apparatus according to claim 24, including means for delivering air into the length of tubular material as it approaches the shirring means.*

*26. An apparatus according to claim 25, including a floating tube supporting the tubular length of casing material as it passes through said rollers and casing cutting means therefore, said floating tube being aligned with and movable axially towards and away from the stuffing horn at the first location, whereby the floating tube is movable out of the path of the cutting means during operation of the cutting means.*

* * * * *